United States Patent
Higashi et al.

(10) Patent No.: US 11,132,776 B2
(45) Date of Patent: Sep. 28, 2021

(54) IMAGE PROCESSING DEVICE, IMAGE PROCESSING METHOD, AND IMAGE PROCESSING PROGRAM FOR MAINTAINING SHARPNESS OF IMAGE

(71) Applicant: EIZO Corporation, Hakusan (JP)

(72) Inventors: Masafumi Higashi, Hakusan (JP); Haifeng Chen, Hakusan (JP); Reo Aoki, Hakusan (JP)

(73) Assignee: EIZO Corporation, Hakusan (JP)

( * ) Notice: Subject to any disclaimer, the term of this patent is extended or adjusted under 35 U.S.C. 154(b) by 96 days.

(21) Appl. No.: 16/628,692

(22) PCT Filed: Aug. 3, 2017

(86) PCT No.: PCT/JP2017/028320
§ 371 (c)(1),
(2) Date: Jan. 6, 2020

(87) PCT Pub. No.: WO2019/026263
PCT Pub. Date: Feb. 7, 2019

(65) Prior Publication Data
US 2020/0184615 A1 Jun. 11, 2020

(51) Int. Cl.
*G06K 9/00* (2006.01)
*G06T 5/50* (2006.01)
(Continued)

(52) U.S. Cl.
CPC .............. *G06T 5/50* (2013.01); *G06T 3/4053* (2013.01); *G06T 5/002* (2013.01); *G06T 5/003* (2013.01);
(Continued)

(58) Field of Classification Search
CPC ......... G06T 5/50; G06T 3/4053; G06T 5/002; G06T 5/003; G06T 7/20;
(Continued)

(56) References Cited

U.S. PATENT DOCUMENTS

| | | | |
|---|---|---|---|
| 2009/0027519 A1* | 1/2009 | Nishiwaki | G06T 7/215 348/241 |
| 2009/0180670 A1* | 7/2009 | Iwamura | G06T 7/215 382/107 |

(Continued)

FOREIGN PATENT DOCUMENTS

| | | |
|---|---|---|
| CN | 102655564 A | 9/2012 |
| JP | H07-131808 A | 5/1995 |

(Continued)

OTHER PUBLICATIONS

Office Action dated Jul. 28, 2020, in corresponding Japanese Application No. 2019-533847, 7 pages.

(Continued)

*Primary Examiner* — Andrew M Moyer
(74) *Attorney, Agent, or Firm* — Maier & Maier, PLLC

(57) ABSTRACT

An image processing device, an image processing method, and an image processing program capable of outputting an image with appropriate sharpness for an input image that may include both a dynamic region and a static region. An image processing device includes a static and dynamic information calculator configured to calculate static and dynamic information of an input image; a blend ratio setting unit configured to determine a blend ratio by performing a predetermined operation on the static and dynamic information of the input image; and an image processing unit configured to generate an output image optimized for static and dynamic change by performing image processing on the input image on the basis of the blend ratio.

9 Claims, 12 Drawing Sheets

(51) Int. Cl.
*G06T 3/40* (2006.01)
*G06T 5/00* (2006.01)
*G06T 7/20* (2017.01)

(52) U.S. Cl.
CPC ...... *G06T 7/20* (2013.01); *G06T 2207/10068* (2013.01)

(58) Field of Classification Search
CPC .......... G06T 2207/10068; G06T 2207/10016; G06T 5/00; H04N 5/14
See application file for complete search history.

(56) References Cited

U.S. PATENT DOCUMENTS

| | | | |
|---|---|---|---|
| 2011/0274368 A1* | 11/2011 | Kondo | G06T 3/4053 382/264 |
| 2012/0024766 A1 | 2/2012 | McKinney | |
| 2012/0250995 A1 | 10/2012 | Matsumoto et al. | |
| 2013/0051771 A1 | 2/2013 | Yamada et al. | |
| 2013/0100263 A1 | 4/2013 | Tsuda | |
| 2016/0080613 A1 | 3/2016 | Nagano | |
| 2016/0148385 A1 | 5/2016 | Koshiba | |
| 2016/0277677 A1 | 9/2016 | Yamada et al. | |
| 2017/0339389 A1* | 11/2017 | Doshi | H04N 9/04511 |

FOREIGN PATENT DOCUMENTS

| | | |
|---|---|---|
| JP | 2011-166535 A | 8/2011 |
| JP | 2011-237998 A | 11/2011 |
| JP | 2012-199613 A | 10/2012 |
| JP | 2012216109 A | 11/2012 |
| JP | 2013-089205 A | 5/2013 |
| JP | 2015177322 A | 10/2015 |
| WO | 2014/188799 A1 | 11/2014 |

OTHER PUBLICATIONS

International Search Report dated Oct. 24, 2017 in corresponding application No. PCT/JP2017/028320; 2 pgs.
Chinese Office Action dated Jun. 30, 2021, in connection with corresponding CN Application No. 201780093464.3 (17 pp., including machine-generated English translation).

* cited by examiner

Fig. 3

$$I(f) = \begin{array}{|c|c|c|c|c|c|c|c|} \hline i\_1.1 & i\_1.2 & i\_1.3 & i\_1.4 & i\_1.5 & i\_1.6 & i\_1.7 & i\_1.8 \\ \hline i\_2.1 & i\_2.2 & i\_2.3 & i\_2.4 & i\_2.5 & i\_2.6 & i\_2.7 & i\_2.8 \\ \hline i\_3.1 & i\_3.2 & i\_3.3 & i\_3.4 & i\_3.5 & i\_3.6 & i\_3.7 & i\_3.8 \\ \hline i\_4.1 & i\_4.2 & i\_4.3 & i\_4.4 & i\_4.5 & i\_4.6 & i\_4.7 & i\_4.8 \\ \hline i\_5.1 & i\_5.2 & i\_5.3 & i\_5.4 & i\_5.5 & i\_5.6 & i\_5.7 & i\_5.8 \\ \hline i\_6.1 & i\_6.2 & i\_6.3 & i\_6.4 & i\_6.5 & i\_6.6 & i\_6.7 & i\_6.8 \\ \hline i\_7.1 & i\_7.2 & i\_7.3 & i\_7.4 & i\_7.5 & i\_7.6 & i\_7.7 & i\_7.8 \\ \hline i\_8.1 & i\_8.2 & i\_8.3 & i\_8.4 & i\_8.5 & i\_8.6 & i\_8.7 & i\_8.8 \\ \hline \end{array}$$

N pixel, M pixel, A1, A2

The average value of the pixel data for the small region is set as the pixel data for one pixel in the reduced image J(f).

Fig. 4A $$J(f) = \begin{array}{|c|c|c|c|} \hline j\_1.1 & j\_1.2 & j\_1.3 & j\_1.4 \\ \hline j\_2.1 & j\_2.2 & j\_2.3 & j\_2.4 \\ \hline j\_3.1 & j\_3.2 & j\_3.3 & j\_3.4 \\ \hline j\_4.1 & j\_4.2 & j\_4.3 & j\_4.4 \\ \hline \end{array} \quad [M/4] \times [N/4]$$

Fig. 4B $$R = J(f-\Delta f) = \begin{array}{|c|c|c|c|} \hline r\_1.1 & r\_1.2 & r\_1.3 & r\_1.4 \\ \hline r\_2.1 & r\_2.2 & r\_2.3 & r\_2.4 \\ \hline r\_3.1 & r\_3.2 & r\_3.3 & r\_3.4 \\ \hline r\_4.1 & r\_4.2 & r\_4.3 & r\_4.4 \\ \hline \end{array} \quad [M/4] \times [N/4]$$

J(f-Δf), which is captured Δf frames before J(f), is stored as R.

| s_1.1 | s_1.2 | s_1.3 | s_1.4 |
|---|---|---|---|
| s_2.1 | s_2.2 | s_2.3 | s_2.4 |
| s_3.1 | s_3.2 | s_3.3 | s_3.4 |
| s_4.1 | s_4.2 | s_4.3 | s_4.4 |

Fig. 5B $$B(f) = \text{bin}(S(f)) =$$

[M/4] × [N/4]

| b_1.1 | b_1.2 | b_1.3 | b_1.4 |
|---|---|---|---|
| b_2.1 | b_2.2 | b_2.3 | b_2.4 |
| b_3.1 | b_3.2 | b_3.3 | b_3.4 |
| b_4.1 | b_4.2 | b_4.3 | b_4.4 |

Each pixel data of S(f) is binarized to 0/1
according to whether the data exceed the predetermined threshold.

Fig. 6  I(f)
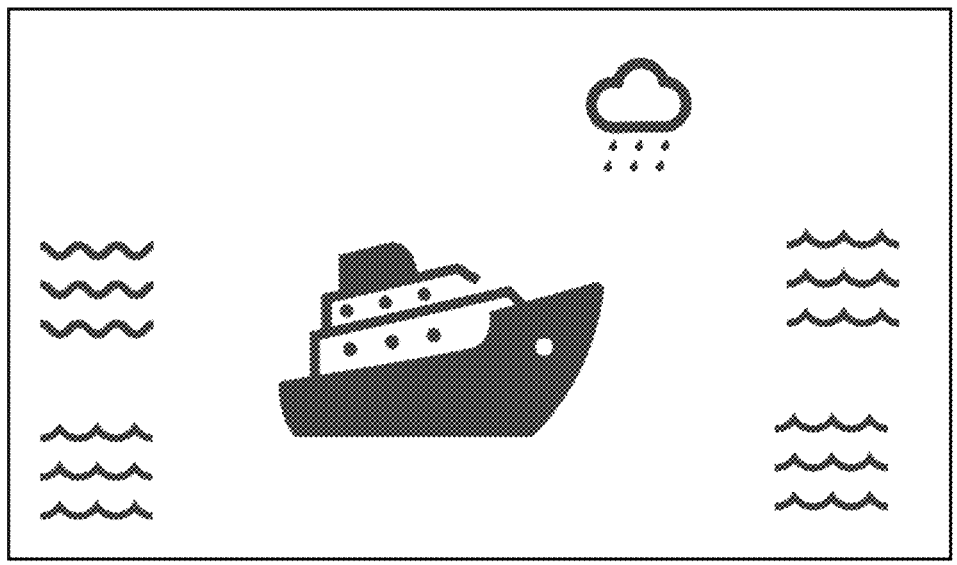
The ship is moving to the right and the rest is stationary.

Fig. 7A J(f)
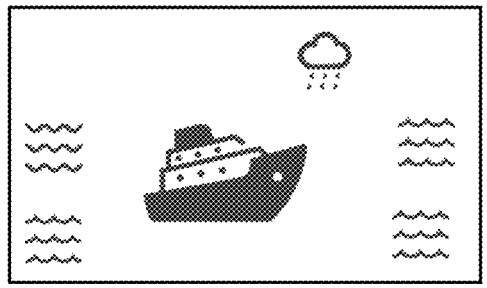
The ship is moving in the right direction.
Fig. 7B R
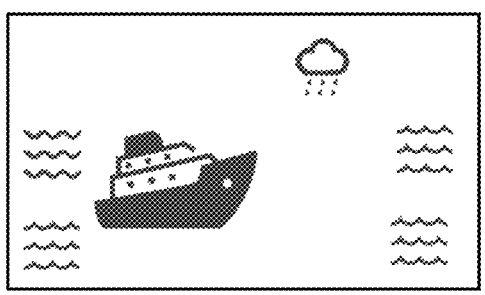
The ship is to the left of the present position.
Fig. 7C B(f)
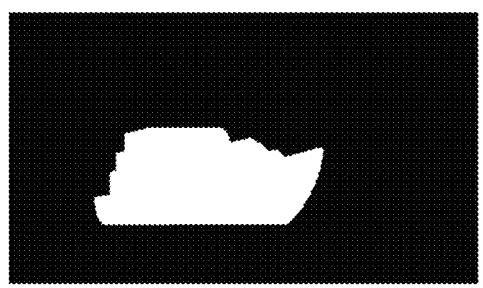
White: dynamic region, Black: static Region

Fig. 9A B(f)

|   | b1 |   |   |
|---|----|---|---|
| 0 | 1  | 1 | 1 |
| 0 | 1  | 1 | 0 |
| 1 | 1  | 1 | 0 |
| 1 | 1  | 0 | 0 |

Fig. 9B X(f) in the middle of calculation

| 0.2 | 0.5 | 0.7 | 0.8 |
| --- | --- | --- | --- |
| 0.3 |     |     |     |
|     |     |     |     |
|     |     |     |     | x1

Fig. 10  Determined X(f)

| 0.2 | 0.5 | 0.7 | 0.8 |
|-----|-----|-----|-----|
| 0.3 | 0.8 | 1 | 0.4 |
| 0.6 | 1 | 1 | 0.1 |
| 0.7 | 1 | 0.7 | 0 |

Fig. 11A  Dynamic region x F0
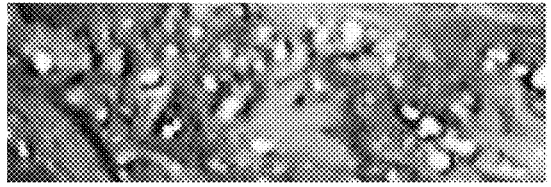
Fig. 11B  Static region x F0
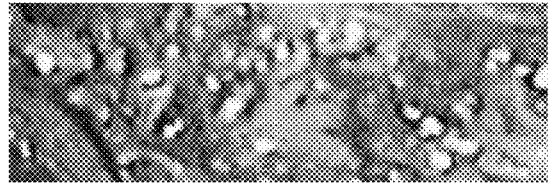
Fig. 11C  Dynamic region x F1
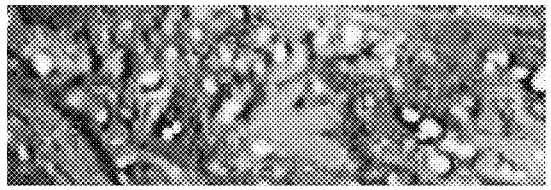
Fig. 11D  Static region x F1
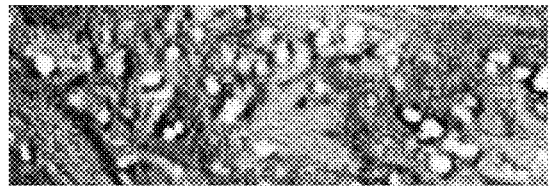
Fig. 11E  Dynamic region x F2
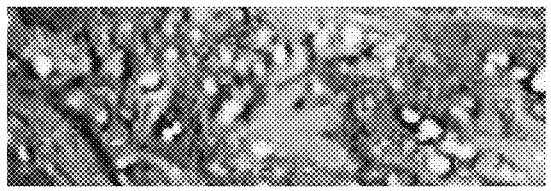
Fig. 11F  Static region x F2
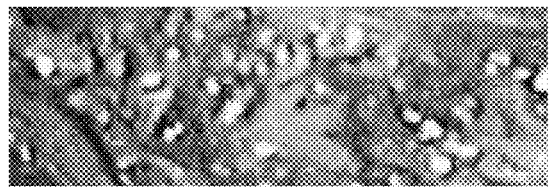

Fig. 12

$$I(f) = \begin{array}{|c|c|c|c|c|c|c|c|}
\hline
i\_1.1 & i\_1.2 & i\_1.3 & i\_1.4 & i\_1.5 & i\_1.6 & i\_1.7 & i\_1.8 \\
\hline
i\_2.1 & i\_2.2 & i\_2.3 & i\_2.4 & i\_2.5 & i\_2.6 & i\_2.7 & i\_2.8 \\
\hline
i\_3.1 & i\_3.2 & i\_3.3 & i\_3.4 & i\_3.5 & i\_3.6 & i\_3.7 & i\_3.8 \\
\hline
i\_4.1 & i\_4.2 & i\_4.3 & i\_4.4 & i\_4.5 & i\_4.6 & i\_4.7 & i\_4.8 \\
\hline
i\_5.1 & i\_5.2 & i\_5.3 & i\_5.4 & i\_5.5 & i\_5.6 & i\_5.7 & i\_5.8 \\
\hline
i\_6.1 & i\_6.2 & i\_6.3 & i\_6.4 & i\_6.5 & i\_6.6 & i\_6.7 & i\_6.8 \\
\hline
i\_7.1 & i\_7.2 & i\_7.3 & i\_7.4 & i\_7.5 & i\_7.6 & i\_7.7 & i\_7.8 \\
\hline
i\_8.1 & i\_8.2 & i\_8.3 & i\_8.4 & i\_8.5 & i\_8.6 & i\_8.7 & i\_8.8 \\
\hline
\end{array}$$

A1 (at i_1.1), N pixel, M pixel

Extract i_4k-3.4l-3 as the representative pixel

IMAGE PROCESSING DEVICE, IMAGE PROCESSING METHOD, AND IMAGE PROCESSING PROGRAM FOR MAINTAINING SHARPNESS OF IMAGE

TECHNICAL FIELD

The present invention relates to an image processing device, an image processing method, and an image processing program.

In a system including a vision sensor (camera), image processing specific to the system is often performed. For example, some endoscope systems comprise a 3D noise reduction function (Patent Literature 1). This function enables noise to be extracted by comparing two consecutive frames, rather than from each single frame, of an input image (moving image) and taking a difference therebetween. This function has higher accuracy than 2D noise reduction in which noise is extracted from a single frame. The image corrected in this way is displayed on a monitor, such as an LCD, in real time, and a doctor or the like can observe the state of the corrected image.

CITATION LIST

Patent Literature

[Patent Literature 1] JP-A-2013-089205

SUMMARY OF INVENTION

Technical Problem

Such an endoscope system generally has a function of temporarily stopping real-time display of the moving image. However, since the images displayed during a pause are the same image (still image), there is a problem that 3D noise reduction in which noise is extracted by taking the difference between images is not effective and the image becomes unclear.

Furthermore, in general, the outline of a moving image tends to be blurred compared to a still image. For example, when a part of the input image is moving, noise stands out in a still region as a result of trying to sharpen a moving region, while the moving region becomes unclear as a result of increasing the degree of noise reduction for reducing noise in the still region.

The present invention has been made in view of such circumstances, and the objective is to provide an image processing device, an image processing method, and an image processing program capable of outputting an image with appropriate sharpness for an input image that may include both a dynamic region and a static region.

According to an viewpoint of the present invention, provided is an image processing device comprising: a static and dynamic information calculator configured to calculate static and dynamic information of an input image; a blend ratio setting unit configured to determine a blend ratio by performing a predetermined operation on the static and dynamic information of the input image; and an image processing unit configured to generate an output image optimized for static and dynamic change by performing image processing on the input image on the basis of the blend ratio, wherein a region as a part of an image including at least one pixel is defined as a "small region", and information indicating, for each small region, static and dynamic change from a past frame to a present frame in a moving image is defined as "static and dynamic information".

In the image processing device according to this viewpoint, the blend ratio setting unit determines the blend ratio by performing the predetermined operation on the static and dynamic information calculated by the static and dynamic information calculator. The output image obtained by performing image processing on the input image on the basis of the blend ratio is optimized for both the static region and the dynamic region. Therefore, it is possible to obtain the output image optimized as a whole for visual recognition.

Various embodiments of the present invention are exemplified below. The embodiments below may be combined with each other.

Preferably, the static and dynamic information is an image having pixel data binarized to binary values of 0 or 1, and a proportion of each of the binary values in a first small region and in a second small region around the first small region of the static and dynamic information is used in the predetermined operation.

Preferably, the image processing unit comprises: a first image processing unit configured to generate a first intermediate image corresponding to the static state by performing image processing on the input image; a second image processing unit configured to generate a second intermediate image corresponding to the dynamic state by performing image processing on the input image; and a third image processing unit configured to generate the output image by superimposing the first and second intermediate images on the basis of the blend ratio, wherein a state without the static and dynamic change is defined as a static state while a state with the static and dynamic change is defined as a dynamic state.

Preferably, the image processing device further comprises a parameter calculator, wherein a state without the static and dynamic change is defined as a static state while a state with the static and dynamic change is defined as a dynamic state, the parameter calculator is configured to calculate a static and dynamic parameter by superimposing a static state parameter corresponding to the static state and a dynamic state parameter corresponding to the dynamic state on the basis of the blend ratio, and the image processing unit uses the static and dynamic parameter to generate the output image.

Preferably, the second small region is a small region adjacent to the first small region on an upper side, upper left side, and left side of the first small region.

Preferably, the image processing unit is configured to perform at least one of noise reduction processing and sharpening processing on the basis of the blend ratio to generate the output image.

Preferably, the image processing unit is configured to perform super-resolution processing on the basis of the blend ratio to generate the output image.

Preferably, the input image is an image on which a three-dimensional noise reduction processing has been performed in advance.

According to another viewpoint of the present invention, provided is an image processing method comprising: a static and dynamic information calculation step of calculating static and dynamic information of an input image; a blend ratio setting step of determining a blend ratio by performing a predetermined operation on the static and dynamic information of the input image; and an image processing step of generating an output image optimized for the static and dynamic change by performing image processing on the input image on the basis of the blend ratio, wherein a region as a part of an image including at least one pixel is defined as a "small region", and information indicating, for each small region, static and dynamic change from a past frame to a present frame in a moving image is defined as "static and dynamic information".

In the image processing method according to this viewpoint, the blend ratio is determined in the blend ratio setting step by performing the predetermined operation on the static and dynamic information calculated in the static and dynamic information calculation step. The output image obtained by performing image processing on the input image on the basis of the blend ratio is optimized for both the static region and the dynamic region. Therefore, it is possible to obtain the output image optimized as a whole for visual recognition.

According to another viewpoint of the present invention, provided is an image processing program for causing a computer to realize a predetermined function, the predetermined function comprising: a static and dynamic information calculation function of calculating static and dynamic information of an input image; a blend ratio setting function of determining a blend ratio by performing a predetermined operation on the static and dynamic information of the input image; and an image processing function of generating an output image optimized for static and dynamic change by performing image processing on the input image on the basis of the blend ratio, wherein a region as a part of an image including at least one pixel is defined as a "small region", and information indicating, for each small region, static and dynamic change from a past frame to a present frame in a moving image is defined as "static and dynamic information".

In the image processing program of this viewpoint, the blend ratio setting function determines the blend ratio by performing the predetermined operation on the static and dynamic information calculated by the static and dynamic information calculation function. The output image obtained by performing image processing on the input image on the basis of the blend ratio is optimized for both the static region and the dynamic region. Therefore, it is possible to obtain the output image optimized as a whole for visual recognition.

BRIEF DESCRIPTION OF DRAWINGS

FIG. 3 is a schematic diagram showing the generation of a reduced image J(f) from an input image I(f).

FIG. 4A and FIG. 4B are schematic diagrams showing the reduced image J(f) generated from the input image I(f) in FIG. 3 and a reference image R, which is a past reduced image J(f−Δf). Specifically, FIG. 4A shows the reduced image J(f), and FIG. 4B shows the reference image R.

FIG. 5A and FIG. 5B are schematic diagrams showing a difference image S(f) generated from the reduced image J(f) and the reference image R in FIG. 4A and FIG. 4B, and a binary image B(f) obtained by binarizing the difference image S(f). Specifically, FIG. 5A shows the difference image S(f), and FIG. 5B shows the binary image B(f).

FIG. 6 shows an example of the input image I(f). FIG. 6 is not related to a medial image transmitted by an endoscope system 2 but is used as a simple example.

FIG. 7A to FIG. 7C are schematic diagrams showing an example of the reduced image J(f), the reference image R, and the binary image B(f) for the input image I(f) in FIG. 6. Specifically, FIG. 7A shows the reduced image J(f), FIG. 7B shows the reference image R, and FIG. 7C shows the binary image B(f).

FIG. 9A and FIG. 9B are examples in which the determination method of the blend ratio shown in FIG. 8 is applied. FIG. 9A shows a partial region of the binary image B(f), and FIG. 9B shows a reduced blend ratio X(f) corresponding to this region, which is in the middle of calculation.

FIG. 10 is an example in which the determination method of the blend ratio shown in FIG. 8 is applied and shows the determined reduced blend ratio X(f).

FIG. 11A to FIG. 11F are diagrams showing various image processing results. Specifically, FIG. 11A to FIG. 11D are comparative examples, and FIG. 11E and FIG. 11F are examples according to the present invention.

FIG. 12 is a schematic diagram showing the generation of a reduced image J(f) from an input image I(f) according to a modified example.

DESCRIPTION OF EMBODIMENTS

Hereinafter, embodiments of the present invention will be described in detail with reference to the drawings. In particular, "unit" in this specification may refer to, for example, a combination of hardware resources implemented by a circuit in a broad sense and the information processing by software that can be specifically realized by these hardware resources.

The circuit in a broad sense is a circuit realized by at least appropriately combining a circuit, a circuitry, a processor, a memory, and the like. That is, this may include an application specific integrated circuit (ASIC), a programmable logic device (for example, a simple programmable logic device (SPLD), a complex programmable logic device (CLPD), and a field programmable gate array (FPGA)), and the like.

In the present embodiment, various information and concepts including this are handled. These may be expressed with signal values as a binary bit aggregate composed of 0 or 1, and communication and operation thereof may be performed on the circuit in a broad sense. Specifically, such information and concepts may include a "small region", which is a part of an image (two-dimensional array) and is a region composed of at least one pixel, a "static and dynamic information", which indicates, for each small region, a static and dynamic change from a past frame to a present frame, and a "blend ratio" obtained by performing, for each small region, an algebraic operation on the static and dynamic information. These will be described again in detail as necessary.

1. System 1 (Overall Configuration)

Figure 1:
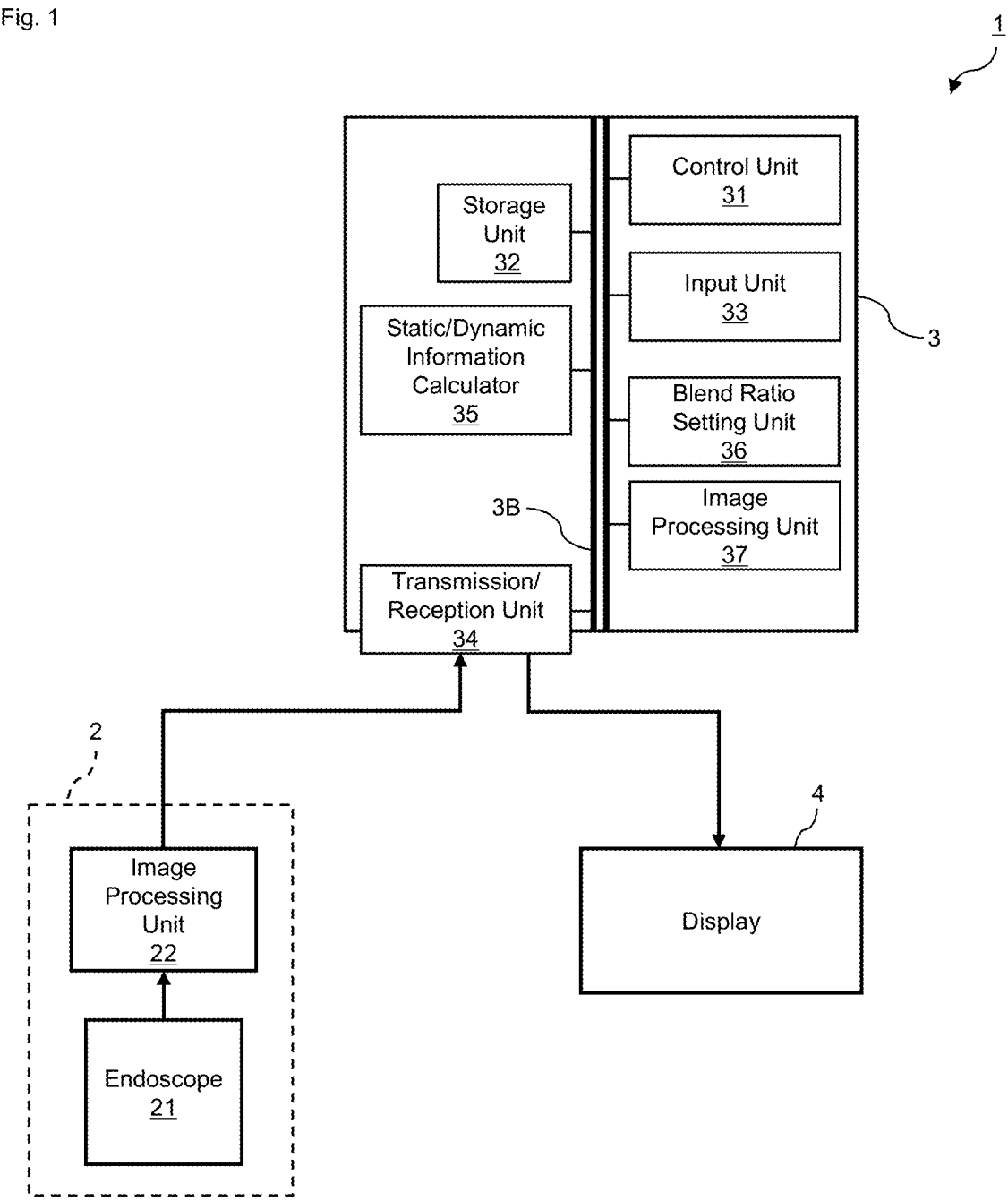
FIG. 1 is a function block diagram showing a schematic configuration of a system 1 using an image processing device 3 according to an embodiment of the present invention.

FIG. 1 is a function block diagram showing a schematic configuration of a system 1 using an image processing device 3 according to an embodiment of the present invention. The system 1 comprises an endoscope system 2, the image processing device 3, and a display 4.

1.1 Endoscope System 2

The endoscope system 2 comprises an endoscope 21 and an image processing unit 22. The endoscope 21 has a vision sensor (camera) (not shown) and is configured to be able to capture an image of an abdominal part of a subject, for example, by inserting the vision sensor from the oral cavity of the subject toward the abdominal part. In this regard, from the viewpoint of information processing, captured image data is a two-dimensional aggregate of pixels (pixel array). Further, the image processing unit 22 performs a predetermined image processing on the image data captured by the endoscope 21. Here, the image processing is 3D noise reduction exemplified in the above-described problem. That is, noise superimposed on the image is reduced, using two frames adjacent in time series among the image data captured by the endoscope 21.

1.2 Image Processing Device 3

The image processing device 3 is a device configured to perform a predetermined image processing on the image data (on which 3D noise reduction has been performed, as described above) transmitted from the endoscope system 2. The image processing device 3 comprises a control unit 31, a storage unit 32, an input unit 33, a transmission and reception unit 34, a static and dynamic information calculator 35, a blend ratio setting unit 36, and an image processing unit 37, and these are connected via a communication bus 3B. The components 31 to 37 are each described in detail below.

<Control Unit 31>

The control unit 31 is configured to perform processing and control of overall operations related to the image processing device 3. The control unit 31 is, for example, a central processing unit (CPU) (not shown). The control unit 31 realizes various functions related to the image processing device 3 or the system 1 by reading a predetermined program stored in the storage unit 32. This includes, for example, reading the predetermined program and causing the display 4 to display a graphical user interface (GUI) screen including the real-time display image of the endoscope 21.

In this regard, although the single control unit 31 is illustrated in FIG. 1, the configuration is not limited thereto. A plurality of control units 31 may be provided for every function, or a combination thereof may by employed.

<Storage Unit 32>

As described above, the storage unit 32 is configured to store various programs to be executed by the control unit 31. This can be implemented as a storage device, such as a hard disk drive (HDD) or a solid state drive (SSD). The storage unit 32 can also be implemented as a memory, such as a random access memory (RAM) that stores temporarily necessary information (arguments, arrays, and the like) related to program operations and may be a combination thereof.

<Input Unit 33>

The input unit 33 may be, for example, a unit included in the image processing device 3 itself or may be externally attached. For example, the input unit 33 can be implemented as a touch panel. Alternatively, a user interface, such as a switch button, a mouse, and a keyboard may be employed. An instruction (command) from an operator (for example, a doctor) is received via the input unit 33. The instruction is transferred to the control unit 31 via the communication bus 3B, and the control unit 31 can perform predetermined control and operations as necessary. As an example of the instruction, the operator can temporarily stop, via the input unit 33, an image that is being captured by the endoscope 21 and displayed on the display 4. That is, in the endoscope system 2, the endoscope 21 can temporarily stop (interrupt) image capturing while the image processing unit 22 can perform 3D noise reduction. Consequently, when temporarily stopped, an image on which 3D noise reduction is not performed is transmitted to the transmission and reception unit 34 in the system 1.

<Transmission and Reception Unit 34>

The transmission and reception unit 34 is a unit for communication between the image processing device 3 and an external device other than the image processing device 3. That is, image data as an input image can be received from the endoscope system 2 via the transmission and reception unit 34 and can be transmitted to the display 4 as an output image after image processing. In this regard, the communication by the transmission and reception unit 34 is not limited to the communication of the image data. Preferably, the unit is implemented as an aggregate of a plurality of communication means, such as wired LAN network communication, Bluetooth communication, and wireless LAN network communication, so as to include an appropriate communication standard for a communication target.

<Static and Dynamic Information Calculator 35>

The static and dynamic information calculator 35 is configured to calculate static and dynamic information of the input image received from the endoscope system 2 via the transmission and reception unit 34. The static and dynamic information is a pixel array indicating a static and dynamic change when the input image is compared with a reference image captured in the past (change in pixel data from a predetermined frame in the past to a present frame). Details regarding the calculation of the static and dynamic information will be described in Section 2.

<Blend Ratio Setting Unit 36>

The blend ratio setting unit 36 is configured to determine a blend ratio for the input image by performing a predetermined algebraic operation on the static and dynamic information calculated by the static and dynamic information calculator 35. The blend ratio is a pixel array for weighting image processing corresponding to (preferably optimized for) a static state (processing for still images) and image processing corresponding to (preferably optimized for) a dynamic state (processing for moving images). For example, the blend ratio is calculated based on the static and dynamic information. When a proportion of the dynamic region is large in a target region (an example of a "first small region" in the claims) and a peripheral region (an example of a "second small region" in the claims), the weighting of the processing for the moving images is increased with respect to the processing for the still images. On the other hand, when a proportion of the static region is large in the target region and the peripheral region, the weighting of the processing for the still images is increased with respect to the processing for the moving images. In this regard, details regarding the determination of the blend ratio will be described in Section 3.

<Image Processing Unit 37>

The image processing unit 37 is configured to generate an output image optimized for both the static state and the dynamic state by performing a predetermined image processing on the basis of the blend ratio. The output image is transmitted to the display 4 via the communication bus 3B and the transmission and reception unit 34, and the display 4 displays the output image. Details regarding the image processing method will be described in Section 2.

1.3 Display 4

The display 4 is a medium for displaying the image data as an image on the basis of each pixel data (information, such as a luminance value of each pixel) when the image data after image processing by the image processing device 3 is input. The display 4 may be, for example, an LCD monitor, a CRT monitor, and an organic EL monitor. In this regard, the image processing device 3 may include the display 4.

2. Static and Dynamic Information

Next, the static and dynamic information will be described in detail.

2.1 Calculation Method of Static and Dynamic Information

Figure 2:
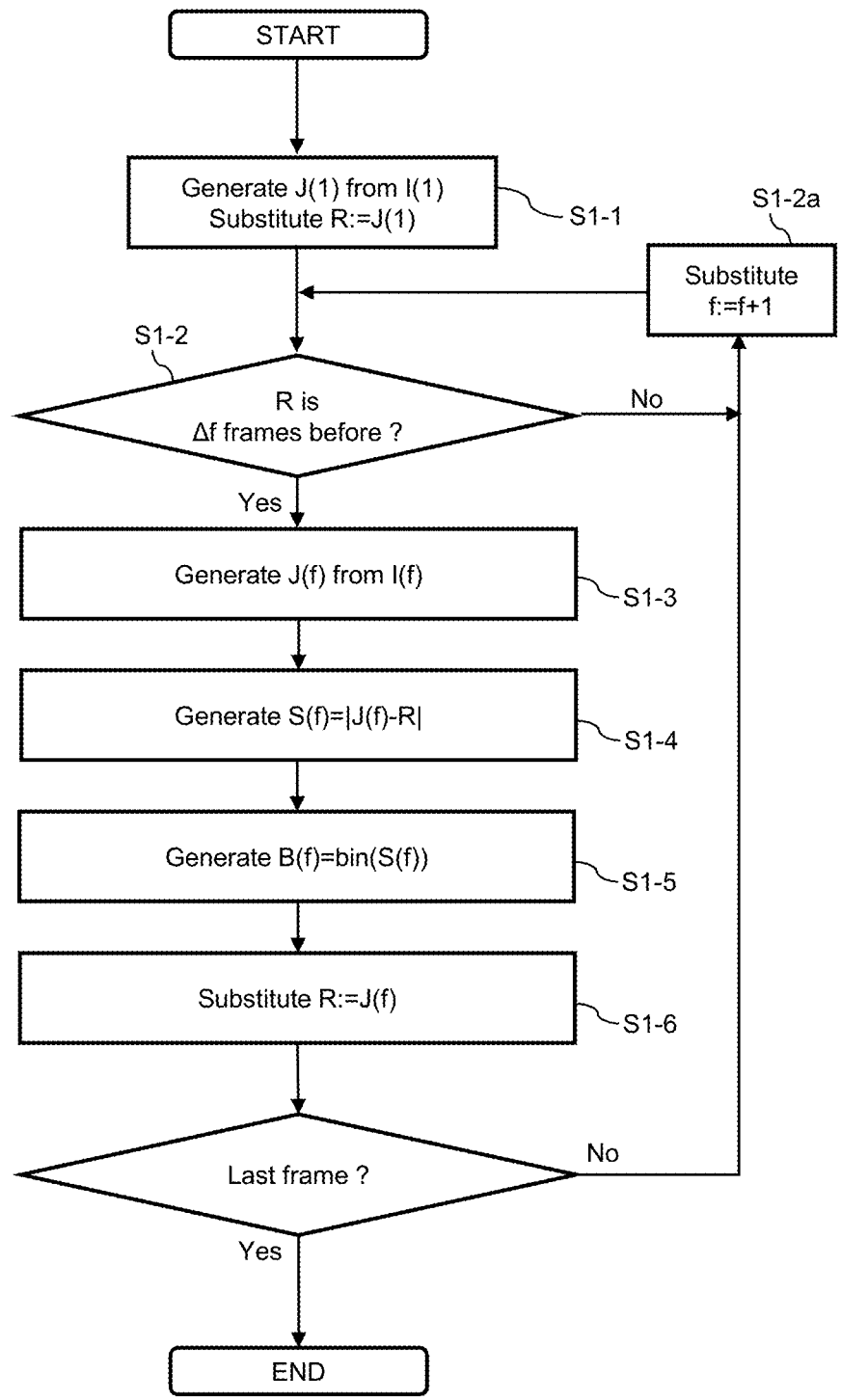
FIG. 2 is a flowchart showing a calculation method of static and dynamic information by a static and dynamic information calculator 35 according to the embodiment of the present invention.

FIG. 2 is a flowchart showing a calculation method of the static and dynamic information by the static and dynamic information calculator 35 according to the embodiment of the present invention. Hereinafter, the flow is described on the basis of each step in FIG. 2.
[Start]
(Step S1-1)
For an input image I(f) (an example of a "present frame" in the claims), an reduced image J(1) obtained by reducing the input image I(1) is registered as a reference image R, and then the process proceeds to Step S1-2.
(Step S1-2)
Subsequently, it is determined whether the reference image R (an example of a "past frame" in the claims) is a frame captured Δf frames before a present input image I(f). Here, the value of Δf is preferably set as appropriate according to a frame rate of the original image data. The value is not particularly limited, and may be, for example, Δf=1, 2, 3, 4, 5, 6, 7, 8, 9, 10, 11, 12, 13, 14, 15. When the image data with a low frame rate is up-converted (for example, from 24 fps to 60 fps) and used as the input image I(f) in order to match a display frame rate of the display 4, input images I(k), I(k+1) adjacent in time series can be the same image. Therefore, it is necessary to set an appropriate Δf for eliminating such a case. Alternatively, a step for determining the frame rate of the input image I(f) may be added so as to set the appropriate Δf. If the reference image R is a frame captured Δf frames before the present input image I(f), the process proceeds to the next step S1-3. If not, the process proceeds to a step S1-2*a*. In this regard, the value off is incremented by +1 in the step S1-2*a*, and then the step S1-2 is performed again.
(Step S1-3)
Subsequently, the input image I(f) is reduced to generate a reduced image J(f), and then the process proceeds to the next step S1-4. In this regard, the reduction process will be described in Section 2.2.
(Step S1-4)
Subsequently, a difference image S(f) is generated by performing difference operation processing on the reduced image J(f) generated in the step S1-3 and the reference image R, and then the process proceeds to the next step S1-5. In this regard, the difference operation processing will be described in detail in Section 2.2.

(Step S1-5)
Subsequently, a binary image B(f) is generated by performing binarization processing on the difference image S(f) generated in the step S1-4, and then the process proceeds to the next step S1-6. In this regard, the binarization processing will be described in detail in Section 2.2. In the present embodiment, the binary image B(f) is the static and dynamic information.
(Step S1-6)
Finally, the reference image R is overwritten and updated to the present reduced image J(f). Thereafter, the process returns to the step S1-2*a*, and the above-described steps S1-2 to S1-6 are repeated. In the case of the last frame, the process ends with that frame.
[End]

2.2 Each Operation Processing

Here, each operation processing in the above-described calculation method of the static and dynamic information is described. FIG. 3 is a schematic diagram showing the generation of the reduced image J(f) from the input image I(f). FIG. 4A and FIG. 4B are schematic diagrams showing the reduced image J(f) generated from the input image I(f) in FIG. 3 and the reference image R, which is a past reduced image J(f−Δf). Specifically, FIG. 4A shows the reduced image J(f), and FIG. 4B shows the reference image R. FIG. 5A and FIG. 5B are schematic diagrams showing the difference image S(f) generated from the reduced image J(f) and the reference image R in FIG. 4A and FIG. 4B and the binary image B(f) obtained by binarizing the difference image S(f). Specifically, FIG. 5A shows the difference image S(f), and FIG. 5B shows the binary image B(f). FIG. 6 shows an example of the input image I(f). FIG. 6 is not related to a medial image transmitted by the endoscope system 2 but is used as a simple example. FIG. 7A to FIG. 7C are schematic diagrams showing an example of the reduced image J(f), the reference image R, and the binary image B(f) for the input image I(f) in FIG. 6. Specifically, FIG. 7A shows the reduced image J(f), FIG. 7B shows the reference image R, and FIG. 7C shows the binary image B(f).
<Reduction Processing>
The input image I(f) is an image having an M×N pixel array (matrix) as shown in FIG. 3. The pixel in the m-th row and the n-th column with respect to the upper left is indicated as a pixel i_m.n. The input image I(f) is reduced by a factor of ¼ in this reduction processing, and an average value of pixel data of 16 pixels i_m.n included in a 4×4 small region is adopted as pixel data for one pixel of the reduced image J(f). For example, the average value of the pixel data of the pixels i_1.1 to i_4.4 is calculated for a small region A1 in the input image I(f), and the average value of the pixel data of the pixels i_5.5 to i_8.8 is calculated for a small region A2 in the input image I(f). An image obtained by repeating this for each small region is the reduced image J(f) shown in FIG. 4A.

The reduced image J(f) is an image having a pixel array (matrix) of [M/4]×[N/4] ([ ] is a Gauss symbol) corresponding to each small region in the input image I(f), as described above. The pixel in the m-th row and the n-th column with respect to the upper left is indicated as a pixel j_m.n. For example, the pixel data of the pixel j_1.1 is the average value of the pixel data of the pixels i_1.1 to i_4.4, the pixel data of the pixel j_1.2 is the average value of the pixel data of the pixels i_1.5 to i_4.8, and the pixel data of the pixel j_2.2 is the average value of the pixel data of the pixels i_5.5 to i_8.8. The static and dynamic information is calculated on the basis of the reduced image J (f), so that the amount of reserved memory (the storage unit 32) can be reduced, compared to the case where the static and dynamic information is calculated by directly using the input image I(f). In this example, the amount of reserved memory is reduced by about ¹⁄₁₆.

<Difference Operation Processing>

The reference image R is the reduced image J(f-Δf) captured Δf frames before the present reduced image J(f), as described above. Here, the pixel of the reference image R is designated as a pixel r_m.n. Each pixel r_m.n corresponds to the small region in the input image I(f). In the difference operation processing, the difference operation is performed between the matrices of the reduced image J(f) and the reference image R to generate the difference image S(f) (see Equation (1)).

$$S(f)=|J(f)-R| \quad (1)$$

In other words, the pixel data of each pixel s_m.n in the difference image S(f) is represented by the difference between the pixel data of each pixel j_m.n in the reduced image J(f) and the pixel data of each pixel r_m.n in the reference image R.

<Binarization Processing>

In the binarization processing, it is determined whether the pixel data of each pixel s_m.n in the difference image S(f) exceeds a predetermined threshold, and the binary image B(f) is generated so that the pixel data of each pixel b_m.n in the binary image B(f) can have 0 (less than the threshold) or 1 (larger than or equal to the threshold) (see Equation (2)).

$$B(f)=\text{bin}(S(f)) \quad (2)$$

As described above, in this embodiment, the binary image B(f) is adopted as the static and dynamic information. As shown in FIG. 7A to FIG. 7C, when motion occurs between the reduced image J(f) obtained by reducing the input image I(f) in FIG. 6 and the reference image R, which is the reduced image J(f-Δf) captured Δf frames before J(f), a change occurs between the pixel data of the corresponding pixel j_m.n and the pixel data of the corresponding pixel r_m.n. Therefore, as a result of the subsequent difference operation processing and binarization processing, each pixel b_m.n of the binary image B(f) has 0 (black: no motion) or 1 (white: with motion) as pixel data. For this reason, the binary image B(f) can be employed as the static and dynamic information indicating the static and dynamic change of each small region in the input image I(f).

3. Blend Ratio

Next, the blend ratio is described in detail. The blend ratio can be determined by a method combining misjudgment reduction processing using a median filter or expansion/reduction processing; and fluctuation control using static-dynamic boundary smoothing by means of a smoothing filter or using the pixel data of adjacent pixels. As an example, a method of combining fluctuation control using three pixels near a pixel of interest (corresponding to the small region for the input image I(f)) and linear enlargement is described below.

3.1 Determination Method of Blend Ratio

Figure 8:
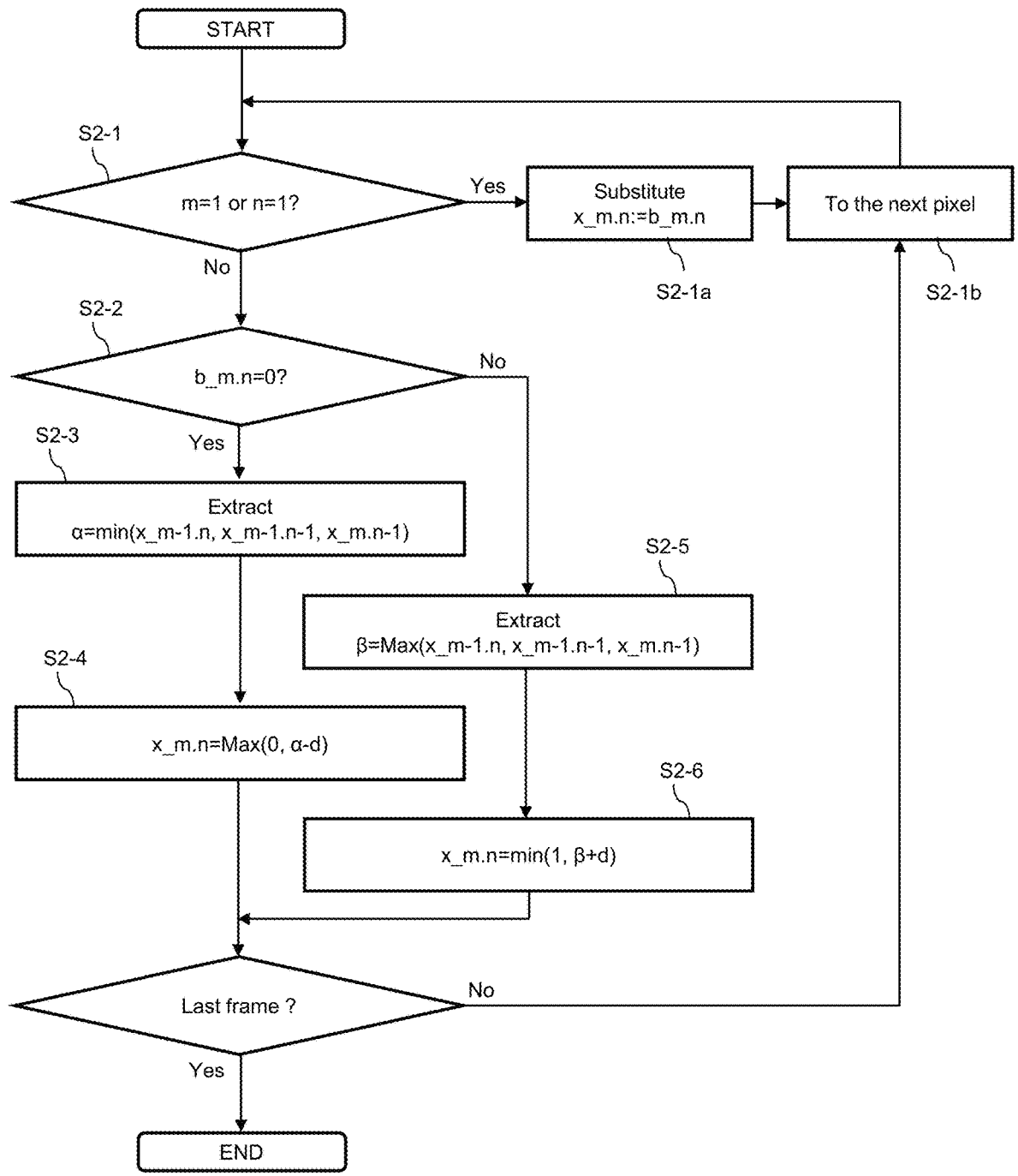
FIG. 8 is a flowchart showing a determination method of a blend ratio by a blend ratio setting unit 36 according to the embodiment of the present invention.

FIG. 8 is a flowchart showing a determination method of the blend ratio by the blend ratio setting unit 36 according to the embodiment of the present invention. In this method, first, a reduced blend ratio X(f) is determined from each pixel b_m.n of the binary image B(f), as shown in steps S2-1 to S2-6. The reduced blend ratio X(f) is an image having a pixel array (matrix) of [M/4]×[N/4], and the pixel in the m-th row and the n-th column with respect to the upper left is indicated as a pixel x_m.n. Finally, a blend ratio Y(f) is determined by performing linear enlargement processing in a step S2-7. The flow is described below based on each step in FIG. 8.

[Start]

(Step S2-1)

It is determined whether each pixel b_m.n is a pixel b_m.n in the upper left end. When the pixel b_m.n is the pixel b_m.n in the upper left end, the pixel data of the corresponding pixel x_m.n is substituted for the pixel data of the pixel b_m.n (0 or 1), as shown in a step S2-1*a*, and the process proceeds to the next pixel b_m.n+1 (or the pixel b_m+1.1), as shown in a step S2-1*b*. When the pixel b_m.n is not the pixel b_m.n in the upper left end, the process proceeds to the next step S2-2.

(Step S2-2)

It is determined whether the pixel data of the pixel b_m.n is 0 or 1. In other words, it is determined whether the corresponding small region in the input image I(f) is the static region (0) or the dynamic region (1). When the pixel data of the pixel b_m.n is 0, the process proceeds to the steps S2-3 and S2-4, and when the pixel data of the pixel b_m.n is 1, the process proceeds to the steps S2-5 and S2-6.

(Step S2-3)

Attention is paid to the pixel data of three pixels on the upper, upper left, and left of the pixel x_m.n (a pixel of interest for which pixel data is to be determined) corresponding to the pixel b_m.n to be processed this time. They are a pixel x_m-1.n, a pixel x_m-1.n-1, and a pixel x_m.n-1, respectively. Then, the minimum value of the pixel data of these three is extracted as α, and the process proceeds to the next step S2-4.

(Step S2-4)

The larger value between a value obtained by subtracting a value of a predetermined parameter d from α determined in the step S2-3 and 0 is determined as the pixel data of the pixel x_m.n. In this regard, the parameter d is a parameter freely adjustable. Subsequently, the process proceeds to the next pixel b_m.n+1 (or a pixel b_m+1.1). The process ends when there is no next pixel.

(Step S2-5)

Attention is paid to the pixel data of three pixels on the upper, upper left, and left of the pixel x_m.n (a pixel of interest for which pixel data is to be determined) corresponding to the pixel b_m.n to be processed this time. They are a pixel x_m-1.n, a pixel x_m-1.n-1, and a pixel x_m.n-1, respectively. Then, the maximum value of the pixel data of these three is extracted as β, and the process proceeds to the next step S2-6.

(Step S2-6)

The smaller value between a value obtained by adding the value of the predetermined parameter d to β determined in the step S2-5 and 1 is determined as the pixel data of the pixel x_m.n. In this regard, the parameter d is a parameter freely adjustable. Subsequently, the process proceeds to the next pixel b_m.n+1 (or a pixel b_m+1.1). The process ends when there is no next pixel.

[End]

3.2 Application Example

Figures 9A, 9B:
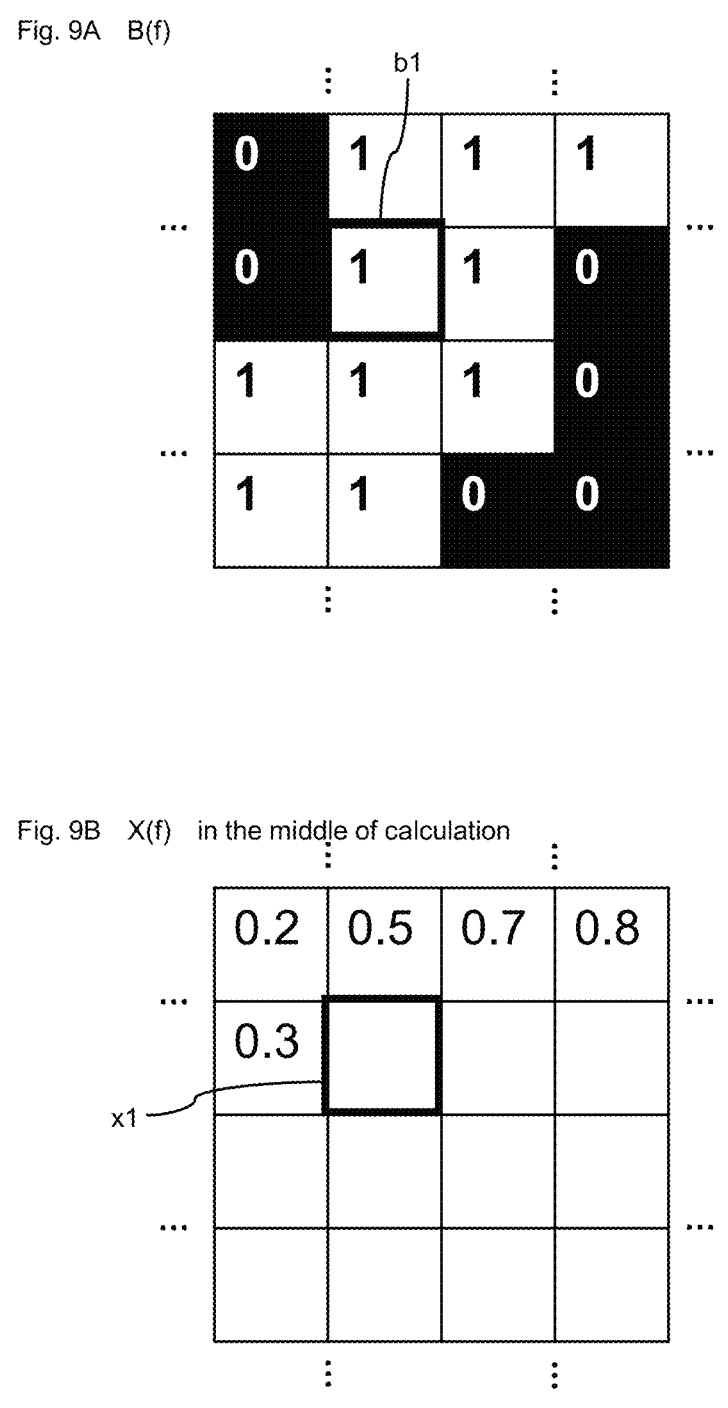

FIG. 9A and FIG. 9B are examples in which the determination method of the blend ratio shown in FIG. 8 is applied. FIG. 9A shows a partial region of the binary image B(f), and FIG. 9B shows the reduced blend ratio X(f) corresponding to this region, which is in the middle of calculation. Further, FIG. 10 is an example in which the determination method of the blend ratio shown in FIG. 8 is applied and shows the determined reduced blend ratio X(f).

Here, the determination of pixel data of a pixel of interest x1 in FIG. 9B (an example of a "first small region" in the claims) is described. First, the pixel of interest x1 does not constitute an end part, and the pixel data of a pixel b1 of the binary image B(f) corresponding to the pixel of interest x1 is 1. Therefore, in the flowchart shown in FIG. 8, the process is performed in the order of the steps S2-1, S2-2, S2-5, and S2-6. In the step S2-5, the pixel data of three pixels (an example of a "second small region" in the claims) on the upper, upper left, and left of the pixel x1 are 0.5, 0.2, and 0.3, respectively. Therefore, the maximum value $\beta$ is 0.5. When the parameter d=0.3, then $\beta$+d=0.5+0.3=0.8 in the step S2-6, which is smaller than 1. Therefore, the pixel data of the pixel x1 is determined to be 0.8.

Similarly, the same operation is performed for other pixels one after another to determine the reduced blend ratio X(f) shown in FIG. 10. In other words, in a unit of the small region, the reduced blend ratio X(f) is determined by using the proportion of the dynamic region and the static region among adjacent small regions. The reduced blend ratio X(f) is further linearly enlarged to be determined as a blend ratio Y(f).

4. Image Processing Method

Next, an image processing method is described. For simplicity, a case where an output image O(f) is obtained by multiplying the input image I(f) by an image processing filter F from the left (see Equation (3)) is considered here. In particular, for example, the output image O(f) for each small region is obtained by multiplying the input image I (f) for each small region by the image processing filter F from the left. Such multiplication can be performed by the image processing unit 37 described above.

$$O(f)=F \times I(f) \qquad (3)$$

As the image processing filter F, an image processing filter F0 optimized for the static region (or the static state) and an image processing filter F1 optimized for the dynamic region (or the dynamic state) are prepared. For example, the image processing filter F (including F0 and F1) may perform sharpening processing and noise reduction processing on the input image I(f). The filters F0 and F1 may perform different processing, such that the filter F0 (or F1) is a sharpening processing filter while the filter F1 (or F0) is a noise reduction processing filter. Several image processing methods are described below.

4.1 First Image Processing Method

In a first image processing method, a first intermediate image M0(f) obtained as a result of the optimization for the static region and a second intermediate image M1(f) obtained as a result of the optimization for the dynamic region are superimposed on the basis of the blend ratio Y(f) to generate the output image O (f) optimized for both the static region and the dynamic region (see equations (4) to (6)).

$$M0(f)=F0 \times I(f) \qquad (4)$$

$$M1(f)=F1 \times I(f) \qquad (5)$$

$$O(f)=Y(f) \times M0(f)+\{1-Y(f)\} \times M1(f) \qquad (6)$$

Here, this operation is merely an example. Weighting may be further considered, or the operation may be performed using a plurality of parameters to be changed depending on the still and dynamic states. For example, in the case of super-resolution processing using sparse coding, a coefficient used for noise reduction and a coefficient used for improving sharpness can be exemplified. For example, as to the coefficient used for noise reduction, F0 is a coefficient optimized for noise reduction in the static region, and F1 is a coefficient optimized for noise reduction in the dynamic region. Further, as to sharpness improvement, F0 is a coefficient optimized for sharpness improvement in the static region, and F1 is a coefficient optimized for sharpness improvement in the dynamic region. By using such a blend ratio Y(f), these coefficients can be respectively optimized. Here, the image processing unit 37 functions as an example of the first to third image processing units in the claims.

4.2 Second Image Processing Method

In a second image processing method, an image processing filter F0 (an example of a "static state parameter" in the claims) optimized for the static region and an image processing filter F1 (an example of a "dynamic state parameter" in the claims) optimized for the dynamic region are superimposed on the basis of the blend ratio Y(f) to generate an optimization filter F2(an example of a "static and dynamic parameter" in the claims). Further, the input image I(f) is multiplied by the optimization filter F2 from the left, so that the output image O(f) optimized for both the static region and the dynamic region is generated (see equations (7) and (8)).

$$F2=Y(f) \times F0+\{1-Y(f)\} \times F1 \qquad (7)$$

$$O(f)=F2 \times I(f) \qquad (8)$$

In particular, unlike the first image processing method, the image processing itself only needs to be performed once, as shown in Equation (8). Therefore, the circuit configuration of the image processing unit 37 is simpler than that of the first image processing method. Here, this operation is merely an example. Weighting may be further considered, or the operation may be performed using a plurality of parameters to be changed depending on the still and dynamic states. In this regard, the image processing unit 37 functions as an example of the parameter calculation unit in the claims.

4.3 Examples

FIG. 11A to FIG. 11F are diagrams showing various image processing results. Specifically, FIG. 11A to FIG. 11D are comparative examples, and FIG. 11E and FIG. 11F are examples according to the present invention. Super-resolution processing using sparse coding is performed in these examples. For example, as shown in FIG. 11A, an image with extremely low sharpness is obtained when the image processing filter F0 optimized for the static region is applied to the dynamic region. As shown in FIG. 11D, an image with high sharpness and enhanced noise is obtained when the image processing filter F1 optimized for the dynamic region is applied to the static region. On the other hand, when the image processing method according to the present embodiment (here, the second image processing method is applied as an example) is implemented, an image with appropriate sharpness in both the static region and the dynamic region is outputted by the image processing filter F2. In particular, the blend ratio Y(f) is configured to have the pixel data for outputting an image in which a boundary between the dynamic region and the static region is natural. Therefore, when the dynamic region and the static region are mixed in an image, the processing provides a greater effect in optimization.

5. Modified Example

The image processing method according to the present embodiment described above can be also implemented in the following aspect.

Firstly, while the reduction processing by a factor of ¼ is adopted in the present embodiment, the reduction ratio is not particularly limited. For example, reduction processing by a factor of ½ or ⅛ may be performed. Alternatively, the difference image S(f) and the binary image B(f) may be generated from the input image I(f) without performing such processing.

Secondly, in the reduction processing adopted in the present embodiment, another value, such as a median value, may be adopted as a representative value of the pixel data of the pixels i_m.n included in the small region, instead of using the average value. Alternatively, only the pixel i_m.n at a specific position in the small region, for example, the pixel i_4k−3.4l−3 (where 1≤k≤[M/4], 1≤l≤[N/4], and [ ] is a Gauss symbol) may be selected as a representative pixel, as shown in FIG. 12. Particularly, in FIG. 12, the pixel i_1.1 is selected as the representative pixel of the small region A1 in the input image I(f).

Thirdly, while the predetermined operation is performed by using the pixel data of the pixels adjacent on the upper, upper left, and left of the pixel of interest in the determination method of the blend ratio according to the present embodiment, the method is not limited thereto. Since the processing of the pixels is performed in a raster manner, it is preferable to focus on the upper, upper left, and left, while 8 pixels adjacent in the periphery of the pixel of interest may be adopted.

Fourthly, the image processing may be performed by directly using the reduced blend ratio X(f) without generating the blend ratio Y(f). In such a case, each pixel i_m.n of the input image I(f) and each pixel x_m.n of the reduced blend ratio X(f) do not correspond one-to-one with each other. Therefore, image processing operation is needed so that a plurality of pixels i_m.n can correspond to one pixel x_m.n.

Fifthly, when the blend ratio (for example, the reduced blend ratio X(f)) is calculated from the static and dynamic information (for example, the binary image B(f)), these may be different in the size of the two-dimensional array.

Sixthly, the above-described various two-dimensional arrays may be stored as a one-dimensional array during operation as long as a desired image can be finally displayed on the display 4. Further, instead of using the one-dimensional array or the two-dimensional array, operations may be performed sequentially.

Seventhly, although the endoscope system 2 is adopted in the system 1 according to the present embodiment, the configuration is not limited thereto, and any signal source capable of transmitting an input image that may include both a dynamic region and a static region may be applied. That is, even when the present invention is applied to an object other than the endoscope system 2, an image with appropriate sharpness can be outputted for an input image that may include both a dynamic region and a static region.

Eighthly, an image processing program for causing a computer to realize a predetermined function can be provided. The predetermined function comprises a static and dynamic information calculation function of calculating static and dynamic information of an input image; a blend ratio setting function of determining a blend ratio by performing a predetermined operation on the static and dynamic information of the input image; and an image processing function of generating an output image optimized for static and dynamic change by performing image processing on the input image on the basis of the blend ratio, wherein a region as a part of an image including at least one pixel is defined as a "small region", and information indicating, for each small region, static and dynamic change from a past frame to a present frame in a moving image is defined as "static and dynamic information". Further, a computer-readable non-transitory recording medium implementing the functions of the program can be also provided. In addition, such a program can be distributed via the Internet or the like. Furthermore, each part of the system 1 may be contained in the same housing or may be distributed and arranged in a plurality of housings.

6. Conclusion

As described above, the present embodiment can provide an image processing device, an image processing method, and an image processing program capable of outputting an image with appropriate sharpness for an input image that may include both a dynamic region and a static region.

While various embodiments according to the present invention have been described, these are presented as examples and are not intended to limit the scope of the invention. The novel embodiment can be implemented in various other forms, and various omissions, replacements, and changes can be made without departing from the scope of the invention. The embodiments and the modifications thereof are included in the scope and gist of the invention and are included in the invention described in the claims and the equivalents thereof.

REFERENCE LIST

1: system, 2: endoscope system, 21: endoscope, 22: image processing unit, 3: image processing device, 3B: communication bus, 31: control unit, 32: storage unit, 33: input unit, 34: transmission and reception unit, 35: static and dynamic information calculator, 36: blend ratio setting unit, 37: image processing unit, 4: display, A1: small region, A2: small region, B: binary image, B2: binary image, F: image processing filter, F0: image processing filter, F1: image processing filter, F2: optimization filter, I: input image, J: reduced image, M0: first intermediate image, M1: second intermediate image, O: output image, R: reference image, S: difference image, X: reduced blend ratio, Y: blend ratio

The invention claimed is:

1. An image processing device comprising:
   a static and dynamic information calculator configured to calculate static and dynamic information of an input image;
   a blend ratio setting unit configured to determine a blend ratio by performing a predetermined operation on the static and dynamic information of the input image, and
   an image processing unit configured to generate an output image optimized for static and dynamic change by performing image processing on the input image on the basis of the blend ratio, wherein a region as a part of an image including at least one pixel is defined as a "small region", and information indicating, for each small region, static and dynamic change from a past frame to a present frame in a moving image is defined as "static and dynamic information", the static and dynamic information is an image having pixel data binarized to binary values of 0 or 1, a proportion of each of the binary values in a first small region and in a second small region around the first small region within the static and dynamic information is used in the predetermined operation, a state without the static and dynamic change is defined as a static state while a state with the static and dynamic change is defined as a dynamic state, and the blend ratio is used for weighting image processing optimized for the static state and image processing optimized for the dynamic state.

2. The image processing device of claim 1,
wherein the image processing unit comprises:
   a first image processing unit configured to generate a first intermediate image corresponding to the static state by performing image processing on the input image;
   a second image processing unit configured to generate a second intermediate image corresponding to the dynamic state by performing image processing on the input image; and
   a third image processing unit configured to generate the output image by superimposing the first and second intermediate images on the basis of the blend ratio.

3. The image processing device of claim 1, further comprising a parameter calculator,
wherein the parameter calculator is configured to calculate a static and dynamic parameter by superimposing a static state parameter corresponding to the static state and a dynamic state parameter corresponding to the dynamic state on the basis of the blend ratio, and
the image processing unit uses the static and dynamic parameter to generate the output image.

4. The image processing device of claim 1,
wherein the second small region is a small region adjacent to the first small region on an upper side, upper left side, and left side of the first small region.

5. The image processing device of claim 1,
wherein the image processing unit is configured to perform at least one of noise reduction processing and sharpening processing on the basis of the blend ratio to generate the output image.

6. The image processing device of claim 1,
wherein the image processing unit is configured to perform super-resolution processing on the basis of the blend ratio to generate the output image.

7. The image processing device of claim 1,
wherein the input image is an image on which a three-dimensional noise reduction processing has been performed in advance.

8. An image processing method comprising:
a static and dynamic information calculation step of calculating static and dynamic information of an input image;
a blend ratio setting step of determining a blend ratio by performing a predetermined operation on the static and dynamic information of the input image; and
an image processing step of generating an output image optimized for the static and dynamic change by performing image processing on the input image on the basis of the blend ratio,
wherein a region as a part of an image including at least one pixel is defined as a "small region", and information indicating, for each small region, static and dynamic change from a past frame to a present frame in a moving image is defined as "static and dynamic information",
the static and dynamic information is an image having pixel data binarized to binary values of 0 or 1,
a proportion of each of the binary values in a first small region and in a second small region around the first small region within the static and dynamic information is used in the predetermined operation,
a state without the static and dynamic change is defined as a static state while a state with the static and dynamic change is defined as a dynamic state, and
the blend ratio is used for weighting image processing optimized for the static state and image processing optimized for the dynamic state.

9. A non-transitory computer readable storage medium storing an image processing program for causing a computer to realize a predetermined function,
the predetermined function comprising:
   a static and dynamic information calculation function of calculating static and dynamic information of an input image;
   a blend ratio setting function of determining a blend ratio by performing a predetermined operation on the static and dynamic information of the input image; and
   an image processing function of generating an output image optimized for static and dynamic change by performing image processing on the input image on the basis of the blend ratio,
wherein a region as a part of an image including at least one pixel is defined as a "small region", and information indicating, for each small region, static and dynamic change from a past frame to a present frame in a moving image is defined as "static and dynamic information",
the static and dynamic information is an image having pixel data binarized to binary values of 0 or 1,
a proportion of each of the binary values in a first small region and in a second small region around the first small region within the static and dynamic information is used in the predetermined operation,
a state without the static and dynamic change is defined as a static state while a state with the static and dynamic change is defined as a dynamic state, and
the blend ratio is used for weighting image processing optimized for the static state and image processing optimized for the dynamic state.

* * * * *